July 14, 1942.　　　E. SLADECEK　　　2,289,598
MOWER
Filed Aug. 13, 1941　　　4 Sheets-Sheet 2

Inventor
ED SLADECEK,
By Clarence A. O'Brien
Attorney

July 14, 1942. E. SLADECEK 2,289,598
MOWER
Filed Aug. 13, 1941 4 Sheets-Sheet 3

Inventor
ED SLADECEK,
By Clarence A. O'Brien
Attorney

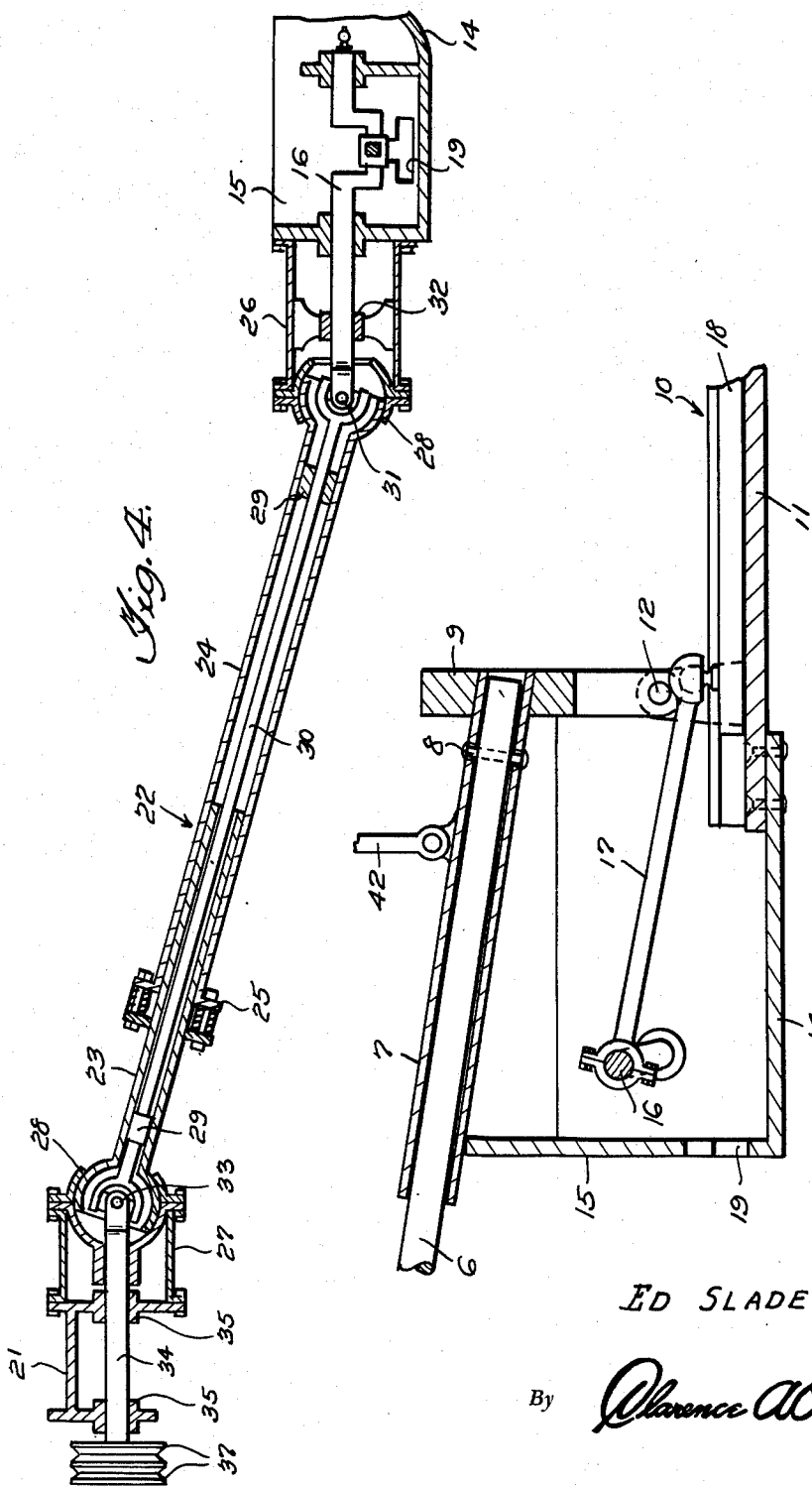

Patented July 14, 1942

2,289,598

UNITED STATES PATENT OFFICE 2,289,598

MOWER

Ed Sladecek, Granger, Tex.

Application August 13, 1941, Serial No. 406,710

2 Claims. (Cl. 56—25)

The present invention relates to new and useful improvements in mowers and has for one of its important objects to provide, in a manner as hereinafter set forth, a device of this character which is adapted to be expeditiously mounted for operation on a conventional agricultural tractor without the necessity of making material structural alterations or changes therein.

Another very important object of the invention is to provide a mower of the aforementioned character which is adapted to be driven from the usual power take-off of the tractor.

Still another very important object of the invention is to provide a mower of the character described which may be elevated and lowered as desired through the medium of the power lift of the tractor.

Other objects of the invention are to provide a mower attachment for tractors which will be comparatively simple in construction, strong, durable, highly efficient and reliable in operation, compact, light in weight, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a view in vertical longitudinal section through the sickle drive.

Figure 5 is a view in vertical section through the transmission unit, taken substantially on the line 5—5 of Figure 2.

Figure 1:
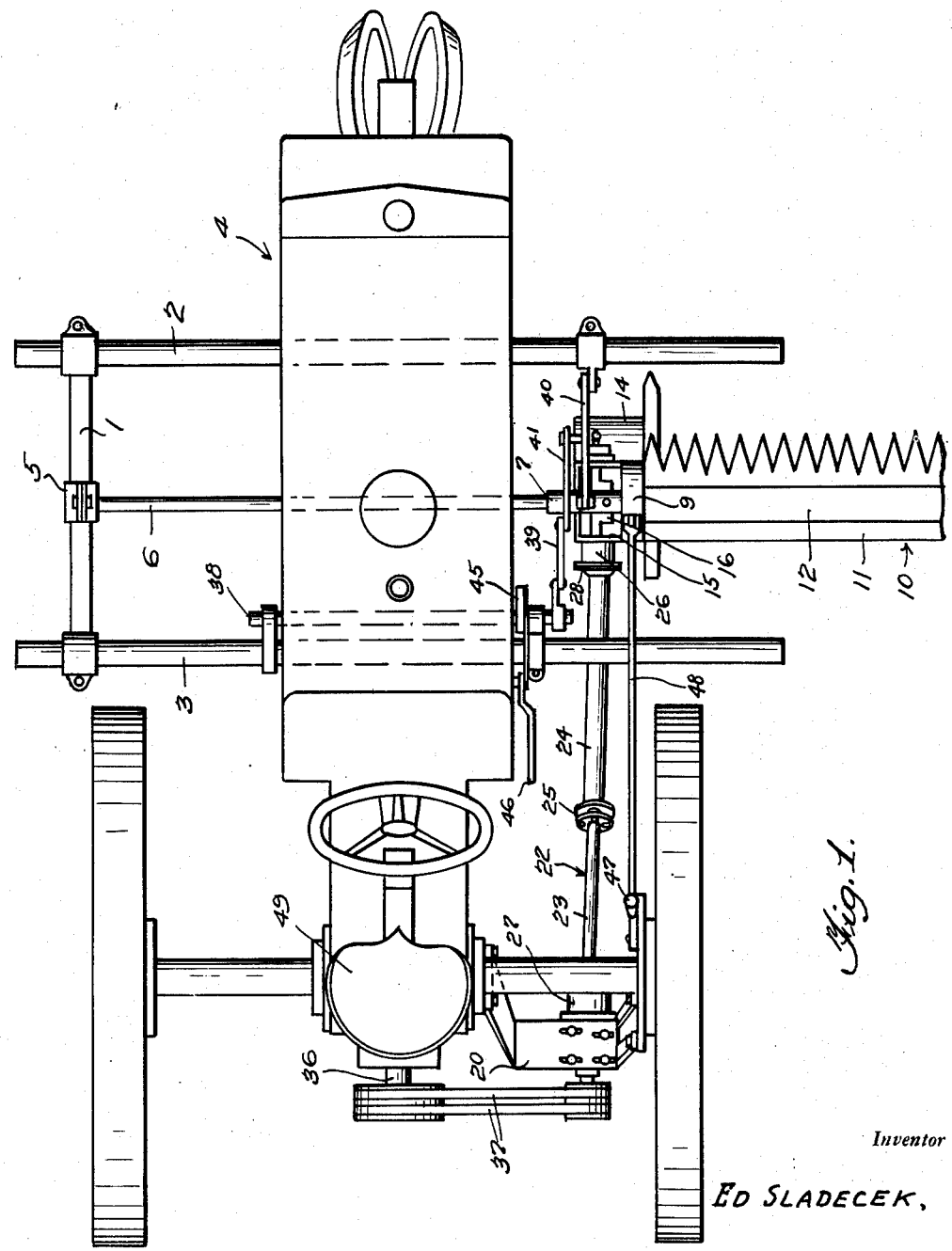
Figure 1 is a top plan view, showing a mower constructed in accordance with the present invention installed for operation on a tractor.
Figure 2:
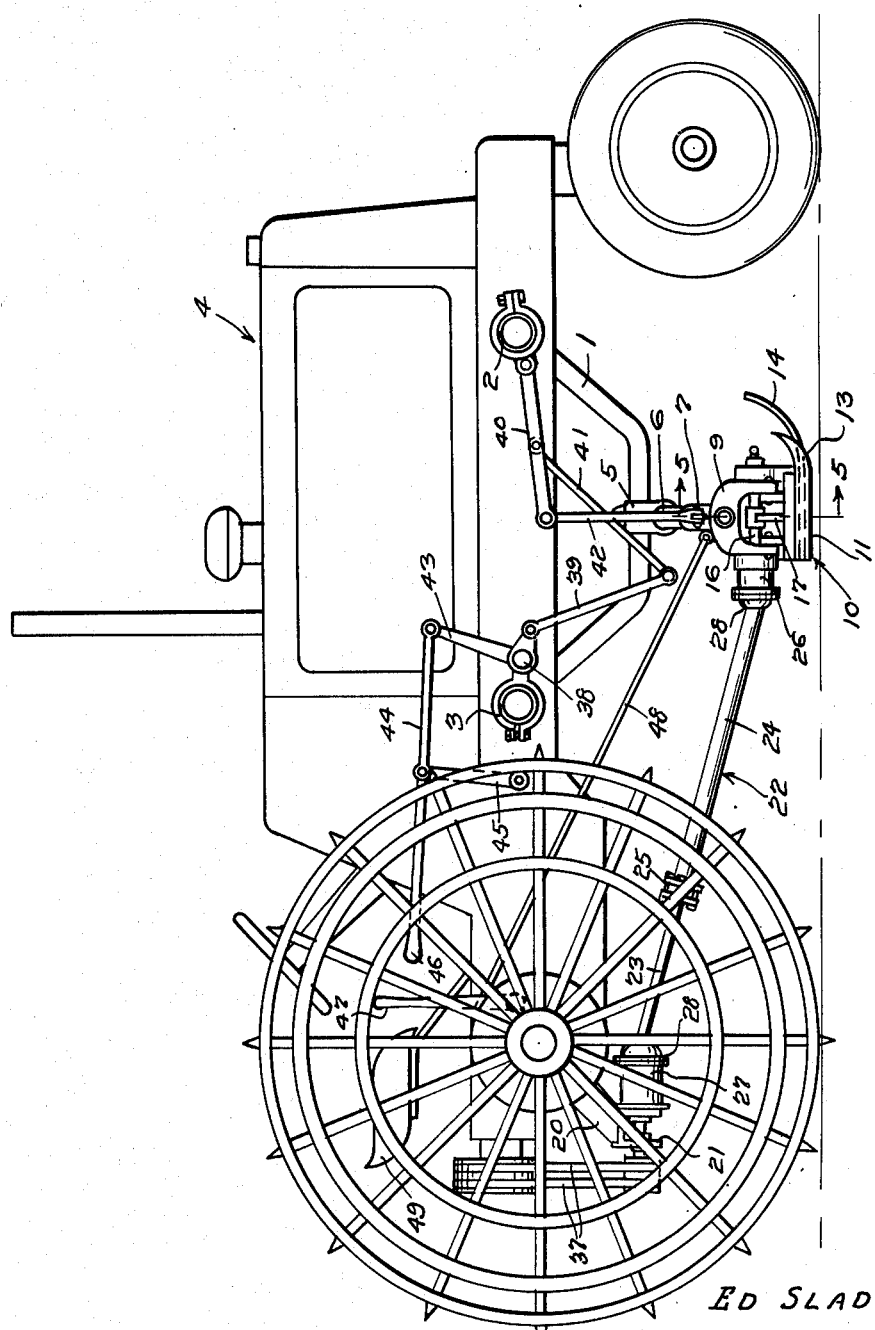
Figure 2 is a view in side elevation thereof.
Figure 3:
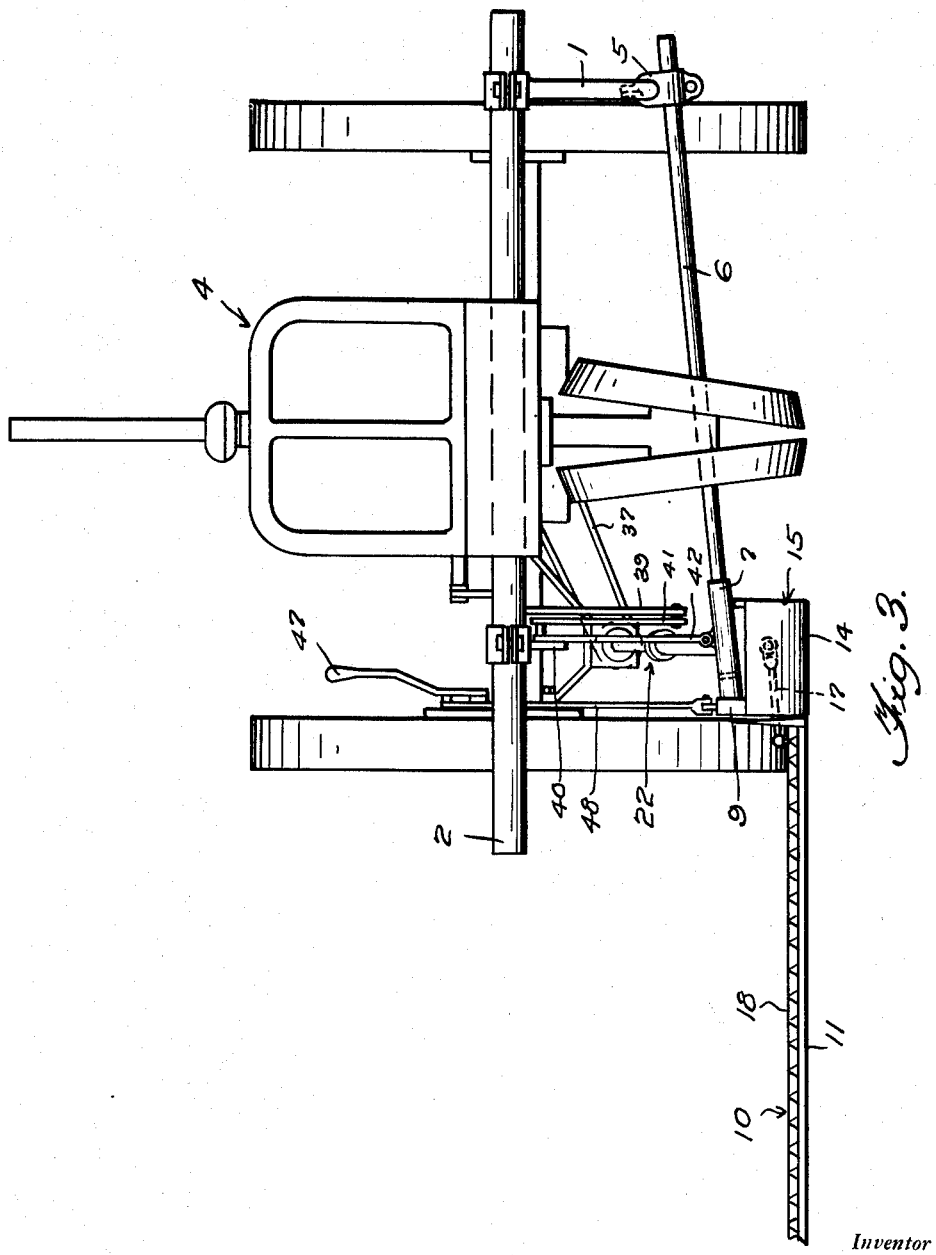
Figure 3 is a front elevational view.

Referring now to the drawings in detail, it will be seen that the embodiment of the invention which has been illustrated comprises a substantially U-shaped hanger 1 which is suspended from the usual tubular tool bars 2 and 3 on one side of a conventional tractor 4. Mounted for swinging movement in a vertical plane on the hanger 1 through the medium of a double clamp 5 and extending transversely beneath the tractor 4 is an arm 6. Journaled for rocking movement on the free end portion of the arm 6 is a sleeve 7 of suitable metal (see Figure 5). A pin and slot connection 8 secures the sleeve 7 on the arm 6 for limited rocking movement.

Fixed on the outer end portion of the sleeve 7 is a yoke 9. Mounted for swinging movement in a vertical plane on the yoke 9 is a cutter 10. The stationary bar 11 of the cutter 10 is pivotally secured at 12 to the legs of the yoke 9. A shoe 13 is provided on the outer end of the cutter 10.

Fixed on the inner end portion of the member 11 of the cutter 10 is an inner shoe 14. The inner shoe 14 is formed to provide a case 15 having journaled therein a longitudinally extending crank shaft 16. A pitman 17 connects the reciprocating member 18 of the cutter 10 to the crank shaft 16 for actuation thereby. The inner wall of the case 15 has formed therein an inverted T-shaped opening 19 to facilitate removing and replacing the reciprocating cutter member 18.

Suspended from the rear end portion of the tractor 4 is a hanger 20. Adjustably mounted beneath the hanger 20 is a bracket 21 (see Figure 4). A tubular drive shaft housing 22 extends between the bracket 21 and the case 15.

The housing 22 comprises a pair of telescopically adjustable male and female sections 23 and 24, respectively. These sections are connected at 25. The tubular housing 22 further includes stationary end sections 26 and 27 to which the outer ends of the sections 23 and 24 are connected by universal joints 28. It will be noted that the section 26 is mounted on the case 15 and that the section 27 is mounted on the bracket 21.

Journaled in bearings 29 which are provided for in the sections 23 and 24 of the tubular housing 22 is a drive shaft 30. The forward end of the drive shaft 30 is connected by a universal joint 31 to the rear end of the crank shaft 16. A bearing 32 is provided in the housing section 26 for the rear end portion of the crank shaft 16. Connected by a universal joint 33 to the rear end of the drive shaft 30 is an extension 34 which is journaled in bearings 35 which are provided therefor in the bracket 21. It will be observed that the universal joints 28 of the housing 22 enclose the universal joints 31 and 33 of the drive shaft 30. The drive shaft extension 34 is connected to the usual power take-off 36 of the tractor 4 through the medium of a dual belt and pulley connection 37.

Rockably mounted on the rear bar 3 of the tractor 4 is a shaft 38. Fixed on the shaft 38 is a forwardly and downwardly directed arm 39. Pivotally mounted on the front bar 2 of the tractor 4 is an arm 40. A link 41 connects the arm 40 to the arm 39 for actuation thereby. Then, a link 42 connects the arm 40 to the sleeve 7 for raising and lowering the cutter 10. Also fixed on the shaft 38 is an arm 43. A rod 44 operatively connects the arm 43 to the usual power lift 45 of the tractor 4. It will thus be seen that the cutter 10 is adapted to be raised and lowered through the medium of the power lift of the tractor. A handle 46, also connected to the power lift 45, permits manual raising and lowering of the cutter 10.

Pivotally mounted on the rear end portion of the tractor 4 is a hand lever 47. A rod 48 has one end connected to the lever 47 and its other end pivotally connected to the yoke 9 for rocking the sleeve 7 on the arm 6, thereby tilting the cutter 10 as desired. The members 46 and 47 are adapted to be conveniently actuated from the operator's seat 49 of the tractor 4.

It is thought that the operation of the apparatus will be readily apparent from a consideration of the foregoing. Of course, the crank shaft 10 of the transmission unit is driven from the power take-off 36 of the tractor 4 for actuating the reciprocating member 18 of the sickle or cutter 10. The inner wall of the case 15 engages beneath the sleeve 7 on the arm 6 for supporting the cutter 10 in a substantially horizontal position on the yoke 9. When desired, the entire cutting assembly may be elevated and lowered through the medium of the power lift 45 of the tractor 4. By actuating the hand lever 47 the cutting assembly may be conveniently tilted to any desired position.

It is believed that the many advantages of a mower constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:

1. A mower attachment for tractors comprising an arm mounted for swinging movement in a vertical plane on the tractor, a rockable sleeve journaled on the free end portion of said arm, a yoke fixed on one end portion of said sleeve, a sickle pivotally mounted for swinging movement in a vertical plane on said yoke, a shoe fixed on one end portion of the sickle and including a case engageable beneath the sleeve for supporting said sickle in a substantially horizontal position, a crank shaft journaled in the case, means operatively connecting said crank shaft to the sickle, means for actuating said crank shaft, means for raising and lowering the arm, and means for rocking the sleeve on the arm for tilting the sickle.

2. A mower attachment for tractors comprising, an arm mounted transversely on the tractor, a sleeve journaled on said arm, a sickle pivotally mounted for swinging movement in a vertical plane on said sleeve, a shoe on one end of said sickle, said shoe including a case engageable beneath the sleeve for supporting the sickle in a substantially horizontal position, said case having an opening therein aligned with the reciprocating member of the sickle for the passage of said member, and means in the case for reciprocating said member.

ED SLADECEK.